United States Patent
Huang et al.

(10) Patent No.: US 10,121,283 B2
(45) Date of Patent: Nov. 6, 2018

(54) METHOD AND SYSTEM FOR RECONSTRUCTING SURFACE FROM POINT CLOUD

(71) Applicant: SHENZHEN INSTITUTES OF ADVANCED TECHNOLOGY CHINESE ACADEMY OF SCIENCES, Shenzhen (CN)

(72) Inventors: Hui Huang, Shenzhen (CN); Kangxue Yin, Shenzhen (CN); Daniel Cohen-Or, Tel Aviv (IL)

(73) Assignee: SHENZHEN INSTITUTES OF ADVANCED TECHNOLOGY C.A.S., Shenzhen (CN)

( * ) Notice: Subject to any disclaimer, the term of this patent is extended or adjusted under 35 U.S.C. 154(b) by 37 days.

(21) Appl. No.: 15/371,148

(22) Filed: Dec. 6, 2016

(65) Prior Publication Data
US 2017/0084080 A1    Mar. 23, 2017

Related U.S. Application Data

(63) Continuation of application No. PCT/CN2014/084714, filed on Aug. 19, 2014.

(30) Foreign Application Priority Data

Jun. 24, 2014 (CN) .......................... 2014 1 0287402

(51) Int. Cl.
*G06T 17/30* (2006.01)
*G06T 17/10* (2006.01)

(52) U.S. Cl.
CPC .............. *G06T 17/10* (2013.01); *G06T 17/30* (2013.01); *G06T 2210/56* (2013.01)

(58) Field of Classification Search
CPC combination set(s) only.
See application file for complete search history.

(56) References Cited

U.S. PATENT DOCUMENTS

| 8,004,517 B1 | 8/2011 | Edelsbrunner et al. |
| 2003/0034971 A1* | 2/2003 | Fujiwara ................. G06T 17/30 |
| | | 345/420 |

(Continued)

FOREIGN PATENT DOCUMENTS

| CN | 101388118 A | 3/2009 |
| CN | 101639945 A | 2/2010 |
| CN | 103824325 A | 5/2014 |

OTHER PUBLICATIONS

Zhang, Yongjie, et al. "Patient-specific vascular NURBS modeling for isogeometric analysis of blood flow." Computer methods in applied mechanics and engineering 196.29-30, (2007) 2943-2959.*

(Continued)

*Primary Examiner* — Sultana M Zalalee
(74) *Attorney, Agent, or Firm* — Hemisphere Law, PLLC; Zhigang Ma

(57) ABSTRACT

A method for reconstructing surface from a point cloud includes following steps: (a) extracting skeletal curves from an input point cloud; (b) editing the extracted skeletal curves, and assigning sweeping path; (c) obtaining sliced point clouds along the edited skeletal curves, and fitting a closed NURBS curve according to the sliced point clouds; (d) reconstructing the point cloud to get generalized cylinders along the assigned sweeping path, according to the closed NURBS curves; (e) merging the generalized cylinders into a single surface, and smoothing intersections of the generalized cylinders so as to reconstruct surface from the point cloud. The invention further relates to a system for reconstructing surface from a point cloud. The invention can reconstruct the surface with high accuracy by the minimum (Continued)

interactions, and can deal with point cloud data having missing region caused by occlusion. In addition, the invention can achieve high reconstruction quality and fine controllability.

17 Claims, 2 Drawing Sheets

(56) References Cited

U.S. PATENT DOCUMENTS

| | | | |
|---|---|---|---|
| 2008/0024500 A1* | 1/2008 | Bae | G06T 11/203 345/442 |
| 2013/0127836 A1* | 5/2013 | Joshi | G06T 11/203 345/419 |
| 2013/0187919 A1* | 7/2013 | Medioni | G06T 17/00 345/420 |
| 2014/0334670 A1* | 11/2014 | Guigues | G06K 9/00342 382/103 |

OTHER PUBLICATIONS

Cao, Junjie, et al. "Point cloud skeletons via laplacian based contraction." Shape Modeling International Conference (SMI), 2010. IEEE, 2010.*

Wang, Wenping, Helmut Pottmann, and Yang Liu. "Fitting B-spline curves to point clouds by curvature-based squared distance minimization." ACM Transactions on Graphics (ToG) 25.2 (2006): 214-238.*

Biermann, Henning, et al. "Sharp features on multiresolution subdivision surfaces." Graphical Models 64.2 (2002): 61-77.*

Huang, Hui, et al. "Consolidation of unorganized point clouds for surface reconstruction." ACM transactions on graphics (TOG) 28.5 (2009): 176.*

Liu Huan-Bin et al., Canal Surface Reconstruction from Point Clouds, Journal of Hangzhou Dianzi University, Apr. 2011, P66-69, vol. 31, No. 2, Hangzhou, China.

Liu Huan-Bin, Pipe Surface Reconstruction Form Scatter Point Clouds, Dissertation Submitted to Hangzhou Dianzi University for the Degree of Master, Jan. 2011, PI138-841, vol. 2011, No. 10, Hangzhou, China.

Zhang Tiantian et al., Research on Constructing Slice Technology of NURBS Curve, Journal of Beijing University of Civil Engineering and Architecture, Sep. 2012, P29-32 and 38, vol. 28, No. 3, Beijing, China.

Li Tao et al., C-C Subdivision Surfaces Reconstruction from Triangle Mesh Using Squared Distance Minimization, Journal of Nanjing University of Aeronautics & Astronautics, Jun. 2008, P364-369, vol. 40, No. 3, Nanjing, China.

* cited by examiner (1) cutting    (2) connecting    (3) pruning    (4) extending    (5) deforming

METHOD AND SYSTEM FOR RECONSTRUCTING SURFACE FROM POINT CLOUD

TECHNICAL FIELD

The invention relates to methods and systems for reconstructing surface from a point cloud.

DESCRIPTION OF RELATED ART 3D modeling is one of the main bottlenecks of computer graphics applications such as computer games, movies and CAD. With recent development in 3D scanning technology, 3D point cloud data is becoming widely available. But point cloud data usually has serious noise and missing region caused by occlusion, it is difficult for a conventional surface reconstruction method to produce high-quality result.

Presently, solutions for reconstructing surface from point cloud are centered on automatic method, including Poisson reconstruction, Radial Basis Function, etc. Approximate algorithm for implicit function is usually utilized to construct the surface. Although the algorithm is applied frequently in various degree, the result for the algorithm is poor when data is occluded and the topology structure is ambiguous. In addition, some scholars try to improve quality of point cloud reconstruction by an interactive method. For example, topology mistakes of point cloud reconstruction are overcome by topology structure defined by users, or constrained by inner and outer orientations of the 0-valued iso surface provided by users in distance function.

High-quality result is not achieved by present interactive method for reconstructing surface from a point cloud. The reasons are summarized in four aspects. Firstly, the interactive reconstruction methods are still based on automatic reconstruction method, limited amount of interaction is not enough to improve the poor automatic reconstruction result. Secondly, still using surface smoothness assumption makes it difficult to get good result if the data have sharp features. Thirdly, the methods are too complicated for users to interact with. Fourthly, the methods are immature and unreliable to be utilized widely.

SUMMARY

Thus, it is necessary to provide a robust method and a robust system for reconstructing surface from a point cloud.

Specifically, the invention provides a method for reconstructing surface from a point cloud. The method includes: (a) extracting skeletal curves from an input point cloud; (b) editing the extracted skeletal curves, and assigning sweeping path; (c) obtaining sliced point clouds along the edited skeletal curves, and fitting a closed NURBS curve according to the sliced point clouds; (d) reconstructing the point cloud to get generalized cylinders along the assigned sweeping path; (e) merging the generalized cylinders into a single surface, and smoothing intersections of the generalized cylinders so as to reconstruct surface from the point cloud.

In an embodiment, the method further includes: making interactive operations on the reconstructed surface, so as to improve quality of the surface.

In an embodiment, the editing includes: cutting, connecting, pruning, extending and deforming.

In an embodiment, the step (c) includes: fitting a closed NURBS curve by utilizing squared distance minimization method which is based on curvature, wherein if the fitting result is not satisfied, users are permitted to amend the closed NURBS curve.

In an embodiment, the step (d) includes: sweeping the sliced point clouds along the assigned sweeping path, wherein it is guaranteed that the new sliced point cloud curve matches the inputted point cloud; interpolating each closed NURBS curve outwards, wherein the NURBS curves encounter each other in the boundary, so as to detect relationship of controlling points on different slice curves; combining all the closed NURBS curves together along the sweeping path, after detecting relationship of controlling points on different slice curves.

The invention further provides a system for reconstructing surface from a point cloud. The system includes an extracting module, an editing module, a fitting module, a reconstructing module and an interacting module. The extracting module is configured to extract skeletal curves from an input point cloud. The editing module is configured to edit the extracted skeletal curves, and assign sweeping path. The fitting module is configured to obtain sliced point clouds along the edited skeletal curves, and fit a closed NURBS curve according to the sliced point clouds. The reconstructing module is configured to reconstruct the point cloud to get generalized cylinders along the assigned sweeping path, according to the closed NURBS curves. The reconstructing module is also configured to merge the generalized cylinders into a single surface, and smooth intersections of the generalized cylinders so as to reconstruct surface from the point cloud.

In an embodiment, the system further includes an interacting module. The interacting module is configured to make interactive operations on the reconstructed surface, so as to improve quality of the surface.

In an embodiment, the editing comprises: cutting, connecting, pruning, extending and deforming.

In an embodiment, the fitting module is specifically configured to fit a closed NURBS curve by utilizing squared distance minimization method which is based on curvature, wherein if the fitting result is not satisfied, users are permitted to amend the closed NURBS curve.

In an embodiment, the reconstructing module is specifically configured to: sweep the sliced point clouds along the assigned sweeping path, wherein it is guaranteed that the new sliced point cloud curve matches the inputted point cloud; interpolate each closed NURBS curve outwards, wherein the NURBS curves encounter each other in the boundary, so as to detect relationship of controlling points on different slice curves; combine all the closed NURBS curves together along the sweeping path, after detecting relationship of controlling points on different slice curves.

All in all, the method and the system for reconstructing surface from a point cloud according to the invention can reconstruct the surface with high accuracy by the minimum interactions. The benefits include: 1) able to deal with point cloud data having missing region caused by occlusion, wherein: skeleton curve and tangential curve are used as intermediate representation, and can achieve high accuracy when data is occluded; 2) high reconstruction quality, wherein: very robust compared with conventional fitting algorithm, and achieve high accuracy; 3) simple interaction, wherein: the invention needs users' interactions only in failure of automatic calculation; 4) fine controllability, wherein: the invention breaks three dimensional interactions into two curve interactions orthogonally each other; 5) perfect reconstruction result in theory, wherein: since users are permitted to control two curves orthogonally each other arbitrarily, accuracy of reconstructing surface from the point cloud can be perfect, as long as users pay enough efforts in theory.

DETAILED DESCRIPTION OF PREFERRED EMBODIMENTS

Specific embodiments will be described in detail with reference to the accompanying drawings as follows to further illustrate the invention.

Figure 1:
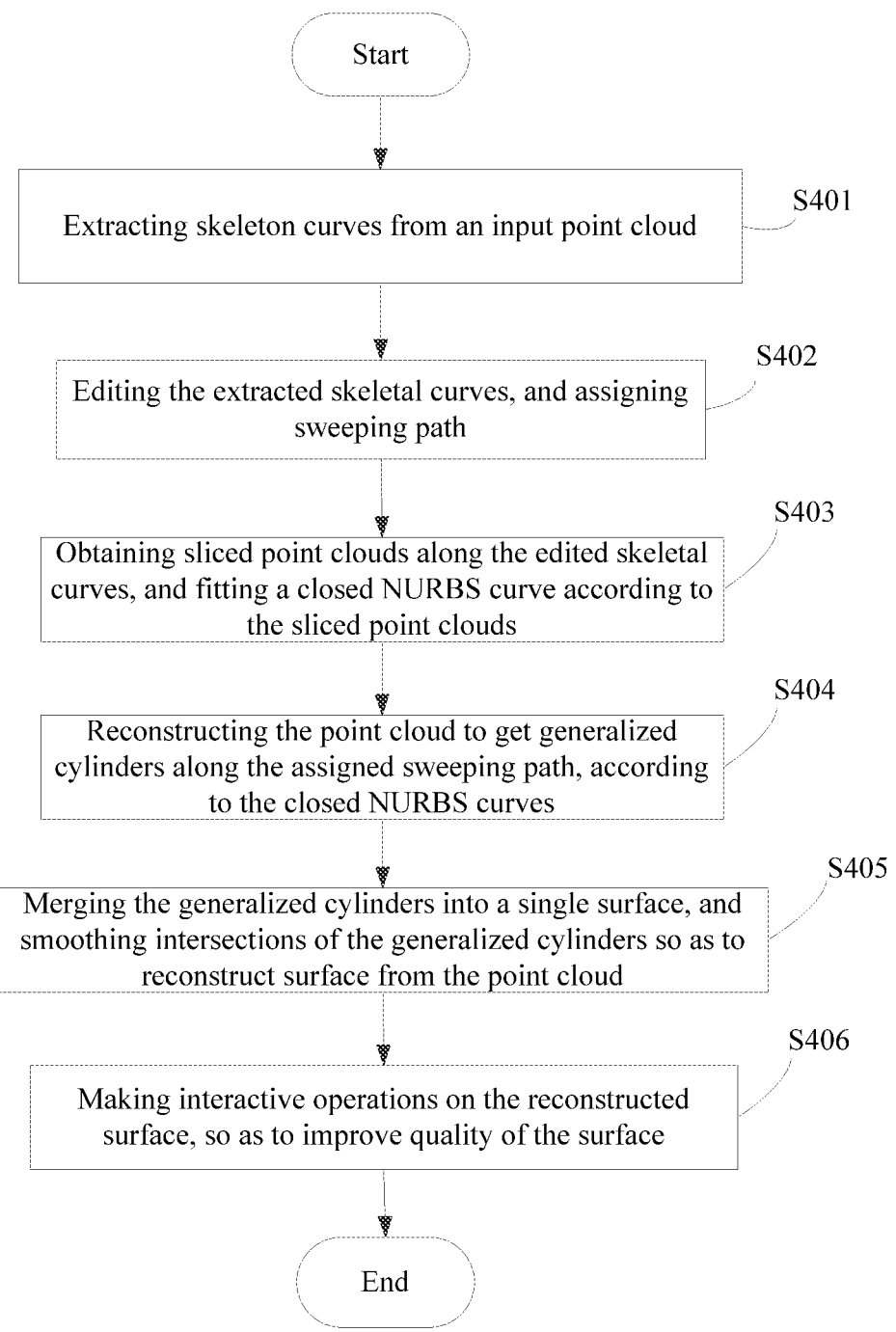
FIG. 1 is a flowchart of a method for reconstructing surface from a point cloud according to the invention.

Referring to FIG. 1, FIG. 1 is a method for reconstructing surface from a point cloud according to a preferred embodiment of the invention.

Step S401, extracting skeletal curves from an input point cloud automatically. Specifically, the preferred embodiment utilizes "L1-median" algorithm to extract skeletal curves from the input point cloud.

Step S402, editing the skeletal curves interactively, and assigning sweeping path. It is specific as follows.

Figure 2:
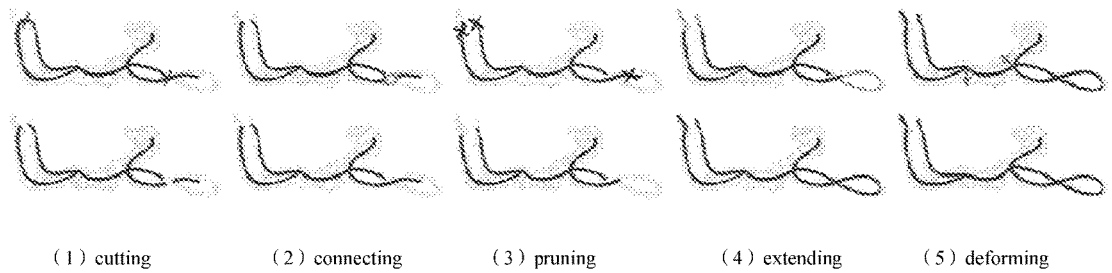
FIG. 2 is a schematic diagram of five basic operations for editing skeleton of a point cloud.

Referring to FIG. 2, the preferred embodiment utilizes five basic operations for editing skeleton of the point cloud. The five basic operations are introduced as follows:

(1) Cutting: deleting a side from skeletal curves of the point cloud, so as to cut a branch from the skeletal curves; or deleting a peak whose degree is greater than 2 from skeletal curves of the point cloud, in order to delete a combination point.

(2) Connecting: connecting two terminal nodes in the skeletal curves of the point cloud, so as to connect two branches into one branch.

(3) Pruning: deleting terminal part of a skeleton branch in the skeletal curves.

(4) Extending: growing forward continuously along tangential terminal from endpoints of the skeleton branch in the skeletal curves of the point cloud.

(5) Deforming: dragging a point of the skeleton in the skeletal curves of the point cloud to deform the skeleton by a user. The illustrated embodiment utilizes least square method to complete.

Step S403, obtaining high quality sliced point clouds along the edited skeletal curves, and fitting a closed NURBS curve according to the sliced point clouds. Detailed steps are as follows.

Selecting high quality sliced point clouds along the edited skeletal curves. Fitting a closed NURBS curve according to the sliced point clouds. The illustrated embodiment fits a closed NURBS curve from two-dimensional sliced point clouds, by utilizing squared distance minimization method which is based on curvature.

If the fitting result is not accurate, users can amend the result by dragging a controlling point of the closed NURBS curve interactively.

Step S404, reconstructing the point cloud to get generalized cylinders along the assigned sweeping path, according to the closed NURBS curves. Concrete steps are as follows:

The illustrated embodiment sweeps the sliced point clouds along the assigned sweeping path. It is guaranteed that the new sliced point cloud curve matches the inputted point cloud.

Interpolating each closed NURBS curve outwards based on the two-dimensional sliced point clouds and the closed NURBS curves. The NURBS curves encounter each other in the boundary, so as to detect relationship of controlling points on different slice curves. Interpolating each closed NURBS curve outwards by minimizing following formula (1):

$$\operatorname{argmin}_{c_j}(E_d(c_j) + \alpha E_m(c_i, c_j)) \quad (1)$$

$c_i$ is an original NURBS curve. $c_j$ is a NURBS curve obtained by Interpolated. $E_d(c_j)$ is the error between $c_j$ and a corresponding two-dimensional sliced point cloud. $E_m(c_i, c_j)$ is deforming degree between $c_i$ and $c_j$. $\alpha$ is a constant. 0.1 is the value of $\alpha$ in the illustrated embodiment. Obtaining adjacent sliced curve from $c_i$ to outwards one by one.

Combining all the closed NURBS curves together along the sweeping path, after detecting relationship of controlling points on different slice curves. Generalized cylinders are solved, which can minimize the deformation of the adjacent sliced curve and can guarantee the fitted point cloud data.

$$\operatorname{argmin}_{\{c_i\}} \sum_{c_i} (E_d(c_i) + \alpha E_m(c_i, c_{i+1}) + \beta E_s(c_{i-1}, c_i, c_{i+1}))$$

In the formula, all of the sliced NURBS curves $\{c_i\}$ along the sweeping path are putted together to be solved. $E_d$ and $E_m$ are consistent in formula (1) respectively. $E_s$ is the smoothing item, which guarantees that the angle connected by the controlling point of three adjacent sliced NURBS curves is as small as possible. $\beta$ is a constant. 0.1 is the value of $\beta$ in the illustrated embodiment.

Step S405, merging the generalized cylinders into a single surface, and smoothing intersections of the generalized cylinders so as to reconstruct surface from the point cloud.

The illustrated embodiment converts the generalized cylinders calculated along the assigned sweeping path to distance fields. The distance fields are combined together by CSG parallel operation. Generating a surface according to the distance fields. Smoothing intersections of the generalized cylinders by Laplace transformation, so as to get an ultimate surface.

Step S406, making interactive operations on the reconstructed surface, so as to improve quality of the surface.

Appoint sharp features: It is permitted for users to draw a line on a two-dimensional screen; the NURBS curve in the generalized cylinders which intersects the line is solved. Amending the weight of NURBS controlling point, so that the reconstructed surface has sharp features consistent with users' requirement.

Amending the reconstructed surface: Sometimes the reconstructed point cloud surface can not satisfy users' requirement. In this circumstance, users can select an arbitrary NURBS curve in the generalized cylinders, and amend the ultimate surface by editing the controlling point on the NURBS curve.

Figure 3:
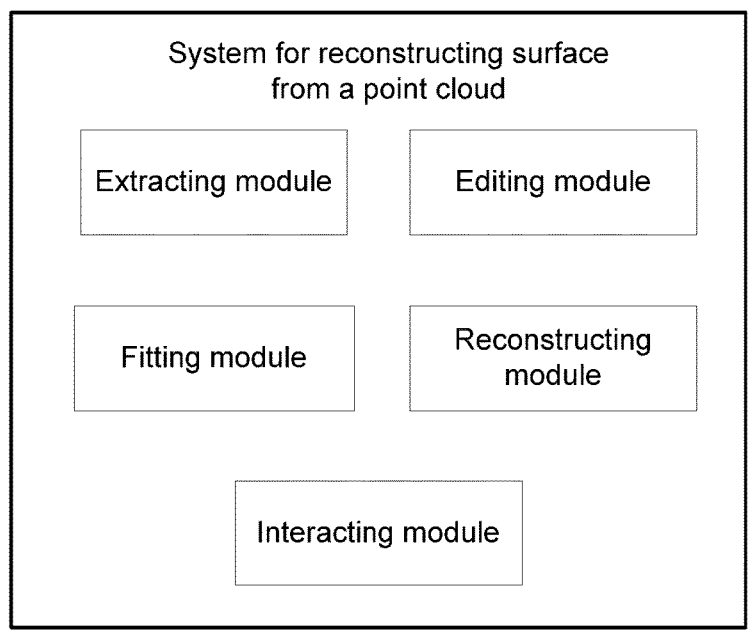
FIG. 3 is a block diagram of a system for reconstructing surface from a point cloud according to the invention.

Referring to FIG. 3, FIG. 3 is a block diagram of a system for reconstructing surface from a point cloud according to the invention. The system includes an extracting module, an editing module, a fitting module, a reconstructing module and an interacting module. All the modules exemplarily are software modules which are stored in a memory and executable by one or more processors.

The extracting module is configured to extract skeletal curves from an input point cloud automatically. Specifically, the illustrated embodiment utilizes "L1-median" algorithm to extract skeletal curves from the input point cloud.

The editing module is configured to edit the skeletal curves interactively, and assign sweeping path. It is specific as follows.

Referring to FIG. 2, the preferred embodiment utilizes five basic operations for editing skeleton of the point cloud. The five basic operations are introduced as follows:

(1) Cutting: deleting a side from skeletal curves of the point cloud, so as to cut a branch from the skeletal curves; or deleting a peak whose degree is greater than 2 from skeletal curves of the point cloud, in order to delete a combination point.

(2) Connecting: connecting two terminal nodes in the skeletal curves of the point cloud, so as to connect two branches into one branch.

(3) Pruning: deleting terminal part of a skeleton branch in the skeletal curves.

(4) Extending: growing forward continuously along tangential terminal from endpoints of the skeleton branch in the skeletal curves of the point cloud.

(5) Deforming: dragging a point of the skeleton in the skeletal curves of the point cloud to deform the skeleton by a user. The illustrated embodiment utilizes least square method to complete.

The fitting module is configured to obtain high quality sliced point clouds along the edited skeletal curves, and fit a closed NURBS curve according to the sliced point clouds. Detailed steps are as follows.

Selecting high quality sliced point clouds along the edited skeletal curves. Fitting a closed NURBS curve according to the sliced point clouds. The illustrated embodiment fits a closed NURBS curve from two-dimensional sliced point clouds, by utilizing squared distance minimization method which is based on curvature.

If the fitting result is not accurate, users can amend the result by dragging a controlling point of the closed NURBS curve interactively.

The reconstructing module is configured to reconstruct the point cloud to get generalized cylinders along the assigned sweeping path, according to the closed NURBS curves. Concrete steps are as follows:

The illustrated embodiment sweeps the sliced point clouds along the assigned sweeping path. It is guaranteed that the new sliced point cloud curve matches the inputted point cloud.

Interpolating each closed NURBS curve outwards based on the two-dimensional sliced point clouds and the closed NURBS curves. The NURBS curves encounter each other in the boundary, so as to detect relationship of controlling points on different slice curves. Interpolating each closed NURBS curve outwards by minimizing following formula (1):

$$\mathrm{argmin}_{c_j}(E_d(c_j)+\alpha E_m(c_i,c_j)) \qquad (1)$$

$c_i$ is an original NURBS curve. $c_j$ is a NURBS curve obtained by Interpolated. $E_d(c_j)$ is the error between $c_j$ and a corresponding two-dimensional sliced point cloud. $E_m(c_i, c_j)$ is deforming degree between $c_i$ and $c_j$. $\alpha$ is a constant. 0.1 is the value of a in the illustrated embodiment. Obtaining adjacent sliced curve from $c_i$ to outwards one by one.

Combining all the closed NURBS curves together along the sweeping path, after detecting relationship of controlling points on different slice curves. Generalized cylinders are solved, which can minimize the deformation of the adjacent sliced curve and can guarantee the fitted point cloud data.

$$\mathrm{argmin}_{\{c_i\}}\sum_{c_i}(E_d(c_i)+\alpha E_m(c_i, c_{i+1})+\beta E_s(c_{i-1}, c_i, c_{i+1}))$$

In the formula, all of the sliced NURBS curves $\{c_i\}$ along the sweeping path are putted together to be solved. $E_d$ and $E_m$ are consistent in formula (1) respectively. $E_s$ is the smoothing item, which guarantees that the angle connected by the controlling point of three adjacent sliced NURBS curves is as small as possible. $\beta$ is a constant. 0.1 is the value of $\beta$ in the illustrated embodiment.

The reconstructing module is also configured to merge the generalized cylinders into a single surface, and smooth intersections of the generalized cylinders so as to reconstruct surface from the point cloud.

The illustrated embodiment converts the generalized cylinders calculated along the assigned sweeping path to distance fields. The distance fields are combined together by CSG parallel operation. Generating a surface according to the distance fields. Smoothing intersections of the generalized cylinders by Laplace transformation, so as to get an ultimate surface.

The interacting module is configured to make interactive operations on the reconstructed surface, so as to improve quality of the surface.

Appoint sharp features: It is permitted for users to draw a line on a two-dimensional screen; the NURBS curve in the generalized cylinders which intersects the line is solved. Amending the weight of NURBS controlling point, so that the reconstructed surface has sharp features consistent with users' requirement.

Amending the reconstructed surface: Sometimes the reconstructed point cloud surface can not satisfy users' requirement. In this circumstance, users can select an arbitrary NURBS curve in the generalized cylinders, and amend the ultimate surface by editing the controlling point on the NURBS curve.

Through the invention is described referring to preferred embodiments, it can be understood by a person skilled in the art that the preferred embodiments mentioned above are merely for illustrating the invention rather than limiting protection scope of the invention, any modification, equivalent substitution and improvement within the spirit and principle of invention should be included in the protection scope of the invention.

What is claimed is:

1. A method for reconstructing surface from a point cloud, the method comprising:
   (a) extracting skeletal curves from an input point cloud;
   (b) editing the extracted skeletal curves, and assigning sweeping path;
   (c) obtaining sliced point clouds along the edited skeletal curves, and fitting a closed NURBS curve according to the sliced point clouds;
   (d) reconstructing the point cloud to get generalized cylinders along the assigned sweeping path, according to the closed NURBS curves;
   (e) merging the generalized cylinders into a single surface, and smoothing intersections of the generalized cylinders so as to reconstruct surface from the point cloud;
   wherein the method further comprises making interactive operations on the reconstructed surface, so as to improve quality of the surface;
   wherein the interactive operations comprise appointing sharp features which comprises drawing a line on a two-dimensional screen, solving the closed NURBS curve in the generalized cylinders intersected with the line and amending weight of an NURBS controlling point;

wherein step (e) comprises converting the generalized cylinders calculated along the assigned sweeping path to distance fields, combining the distance fields together by a CSG parallel operation, generating a surface according to the distance fields, and smoothing the intersections of the generalized cylinders by Laplace transformation, so as to get an ultimate surface.

2. The method according to claim 1, wherein the editing comprises: cutting, connecting, pruning, extending and deforming, and the editing is completed by a least square method.

3. The method according to claim 2, wherein the step (c) comprises:

fitting a closed NURBS curve by utilizing squared distance minimization method which is based on curvature, wherein if the fitting result is not satisfied, users are permitted to amend the closed NURBS curve.

4. The method according to claim 3, wherein the step (d) comprises:

sweeping the sliced point clouds along the assigned sweeping path, wherein it is guaranteed that the new sliced point cloud curve matches the inputted point cloud;

interpolating each closed NURBS curve outwards based on the sliced point clouds which are two-dimensional and the closed NURBS curves, wherein the NURBS curves encounter each other in the boundary, so as to detect relationship of controlling points on different slice curves;

combining all the closed NURBS curves together along the sweeping path, after detecting relationship of controlling points on different slice curves.

5. The method according to claim 4, wherein the process of interpolating each closed NURBS curve outwards is fulfilled by minimizing a following formula:

$$\mathrm{argmin}_{c_j}(E_d(c_j)+\alpha E_m(c_i,c_j))$$

where $c_i$ is an original NURBS curve, $c_j$ is an NURBS curve obtained by interpolating, $E_d(c_j)$ is an error between $c_j$ and a corresponding two-dimensional sliced point cloud, $E_m(c_i, c_j)$ is deforming degree between $c_i$ and $c_j$, and $\alpha$ is a constant which is 0.1.

6. The method according to claim 2, wherein the process of cutting comprises deleting a side from the skeletal curves of the point cloud, so as to cut a branch from the skeletal curves, or deleting a peak whose degree is greater than two from the skeletal curves of the point cloud, in order to delete a combination point; the process of connecting comprises connecting two terminal nodes in the skeletal curves of the point cloud, so as to connect two branches into one branch; the process of pruning comprises deleting a terminal part of a skeleton branch in the skeletal curves; the process of extending comprises growing forward continuously along tangential terminal from endpoints of the skeleton branch in the skeletal curves of the point cloud; the process of deforming comprises dragging a point of a skeleton in the skeletal curves of the point cloud to deform the skeleton.

7. The method according to claim 1, wherein step (a) comprises utilizing an L1-median algorithm to extract the skeletal curves from the input point cloud.

8. The method according to claim 1, wherein the interactive operations further comprise amending the reconstructed surface; amending the reconstructed surface comprises selecting an arbitrary NURBS curve in the generalized cylinders, and amending the ultimate surface by editing a controlling point on the NURBS curve.

9. A system for reconstructing surface from a point cloud comprising one or more processors and a memory stored with a plurality of software modules executable by the one or more processors, wherein the software modules comprise an extracting module, an editing module, a fitting module, a reconstructing module and an interacting module; wherein the extracting module is configured to extract skeletal curves from an input point cloud;

the editing module is configured to edit the extracted skeletal curves, and assign sweeping path;

the fitting module is configured to obtain sliced point clouds along the edited skeletal curves, and fit a closed NURBS curve according to the sliced point clouds;

the reconstructing module is configured to reconstruct the point cloud to get generalized cylinders along the assigned sweeping path, according to the closed NURBS curves;

the reconstructing module is further configured to merge the generalized cylinders into a single surface, and smooth intersections of the generalized cylinders so as to reconstruct surface from the point cloud;

wherein the interacting module is configured to make interactive operations on the reconstructed surface, so as to improve quality of the surface;

wherein the interactive operations comprise appointing sharp features which comprises drawing a line on a two-dimensional screen, solving the closed NURBS curve in the generalized cylinders intersected with the line and amending weight of an NURBS controlling point;

wherein the reconstructing module is specifically configured to convert the generalized cylinders calculated along the assigned sweeping path to distance fields, combine the distance fields together by a CSG parallel operation, generate a surface according to the distance fields, and smooth the intersections of the generalized cylinders by Laplace transformation, so as to get an ultimate surface;

wherein the interacting module is further configured to amend the reconstructed surface, which comprises selecting an arbitrary NURBS curve in the generalized cylinders, and amending the ultimate surface by editing a controlling point on the NURBS curve.

10. The system according to claim 9, wherein the editing comprises: cutting, connecting, pruning, extending and deforming, and the editing is completed by a least square method.

11. The system according to claim 10, wherein the fitting module is specifically configured to:

fit a closed NURBS curve by utilizing squared distance minimization method which is based on curvature, wherein if the fitting result is not satisfied, users are permitted to amend the closed NURBS curve.

12. The system according to claim 11, wherein the reconstructing module is specifically configured to:

sweep the sliced point clouds along the assigned sweeping path, wherein it is guaranteed that the new sliced point cloud curve matches the inputted point cloud;

interpolate each closed NURBS curve outwards based on the sliced point clouds which are two-dimensional and the closed NURBS curves, wherein the NURBS curves encounter each other in the boundary, so as to detect relationship of controlling points on different slice curves;

combine all the closed NURBS curves together along the sweeping path, after detecting relationship of controlling points on different slice curves.

13. The system according to claim 12, wherein the reconstructing module is specifically configured to interpolate each closed NURBS curve outwards fulfilled by minimizing a following formula:

$$\mathrm{argmin}_{c_j}(E_d(c_j)+\alpha E_m(c_i,c_j))$$

where $c_i$ is an original NURBS curve, $c_j$ is an NURBS curve obtained by interpolating, $E_d(c_j)$ is an error between $c_j$ and a corresponding two-dimensional sliced point cloud, $E_m(c_i, c_j)$ is deforming degree between $c_i$ and $c_j$, and $\alpha$ is a constant which is 0.1.

14. The system according to claim 13, wherein the generalized cylinders capable of minimizing deformation of an adjacent sliced curve and guaranteeing fitted point cloud data are solved by minimizing a following formula:

$$\mathrm{argmin}_{\{c_i\}}\sum_{c_i}(E_d(c_i)+\alpha E_m(c_i, c_{i+1})+\beta E_s(c_{i-1}, c_i, c_{i+1}))$$

where $\{c_i\}$ indicates all sliced NURBS curves along the sweeping path, $E_s$ is a smoothing item to guarantee an angle connected by the controlling points of three adjacent sliced NURBS curves to be as small as possible, and $\beta$ is a constant which is 0.1.

15. The system according to claim 10, wherein the process of cutting comprises deleting a side from the skeletal curves of the point cloud, so as to cut a branch from the skeletal curves, or deleting a peak whose degree is greater than two from the skeletal curves of the point cloud, in order to delete a combination point; the process of connecting comprises connecting two terminal nodes in the skeletal curves of the point cloud, so as to connect two branches into one branch; the process of pruning comprises deleting a terminal part of a skeleton branch in the skeletal curves; the process of extending comprises growing forward continuously along tangential terminal from endpoints of the skeleton branch in the skeletal curves of the point cloud; the process of deforming comprises dragging a point of a skeleton in the skeletal curves of the point cloud to deform the skeleton.

16. The system according to claim 9, wherein the extracting module is specifically configured to utilize an L1-median algorithm to extract the skeletal curves from the input point cloud.

17. A method for reconstructing surface from a point cloud, the method comprising:
(a) extracting skeletal curves from an input point cloud;
(b) editing the extracted skeletal curves, and assigning sweeping path;
(c) obtaining sliced point clouds along the edited skeletal curves, and fitting a closed NURBS curve according to the sliced point clouds;
(d) reconstructing the point cloud to get generalized cylinders along the assigned sweeping path, according to the closed NURBS curves;
(e) merging the generalized cylinders into a single surface, and smoothing intersections of the generalized cylinders so as to reconstruct surface from the point cloud;
wherein the method further comprises making interactive operations on the reconstructed surface, so as to improve quality of the surface;
wherein the interactive operations comprise appointing sharp features which comprises drawing a line on a two-dimensional screen, solving the closed NURBS curve in the generalized cylinders intersected with the line and amending weight of an NURBS controlling point;
wherein the editing comprises: cutting, connecting, pruning, extending and deforming, and the editing is completed by a least square method;
wherein the step (c) comprises:
fitting a closed NURBS curve by utilizing squared distance minimization method which is based on curvature, wherein if the fitting result is not satisfied, users are permitted to amend the closed NURBS curve;
wherein the step (d) comprises:
sweeping the sliced point clouds along the assigned sweeping path, wherein it is guaranteed that the new sliced point cloud curve matches the inputted point cloud;
interpolating each closed NURBS curve outwards based on the sliced point clouds which are two-dimensional and the closed NURBS curves, wherein the NURBS curves encounter each other in the boundary, so as to detect relationship of controlling points on different slice curves;
combining all the closed NURBS curves together along the sweeping path, after detecting relationship of controlling points on different slice curves;
wherein the process of interpolating each closed NURBS curve outwards is fulfilled by minimizing a following formula:

$$\mathrm{argmin}_{c_j}(E_d(c_j)+\alpha E_m(c_i,c_j))$$

where $c_i$ is an original NURBS curve, $c_j$ is an NURBS curve obtained by interpolating, $E_d(c_j)$ is an error between $c_j$ and a corresponding two-dimensional sliced point cloud, $E_m(c_i, c_j)$ is deforming degree between $c_i$ and $c_j$ and $\alpha$ is a constant which is 0.1;
wherein the generalized cylinders capable of minimizing deformation of an adjacent sliced curve and guaranteeing fitted point cloud data are solved by minimizing a following formula:

$$\mathrm{argmin}_{\{c_i\}}\sum_{c_i}(E_d(c_i)+\alpha E_m(c_i, c_{i+1})+\beta E_s(c_{i-1}, c_i, c_{i+1}))$$

where $\{c_i\}$ indicates all sliced NURBS curves along the sweeping path, $E_s$ is a smoothing item to guarantee an angle connected by the controlling points of three adjacent sliced NURBS curves to be as small as possible, and $\beta$ is a constant which is 0.1.

* * * * *